(12) United States Patent
Beck

(10) Patent No.: US 6,450,322 B1
(45) Date of Patent: Sep. 17, 2002

(54) ESCAPEMENT DEVICE

(75) Inventor: Christopher Donald Beck, Indianapolis, IN (US)

(73) Assignee: SMC Corporation of America, Indianapolis, IN (US)

( * ) Notice: Subject to any disclaimer, the term of this patent is extended or adjusted under 35 U.S.C. 154(b) by 116 days.

(21) Appl. No.: 09/636,623

(22) Filed: Aug. 11, 2000

(51) Int. Cl.⁷ .............................................. B65G 47/84
(52) U.S. Cl. .................. 198/463.6; 198/463.4
(58) Field of Search ........................ 198/463.4, 463.6, 198/530, 531

(56) References Cited

U.S. PATENT DOCUMENTS

| | | | |
|---|---|---|---|
| 2,341,705 A | | 2/1944 | Fedorchak et al. |
| 2,475,999 A | | 7/1949 | Sparagano |
| 2,632,553 A | | 3/1953 | Stirn et al. |
| 2,920,792 A | | 1/1960 | Lancaster |
| 3,058,569 A | * | 10/1962 | Frank et al. ............. 198/463.4 |
| 3,288,331 A | | 11/1966 | Mazurkivich |
| 3,325,051 A | | 6/1967 | Davis |
| 3,568,823 A | * | 3/1971 | Rettig ..................... 198/463.6 |
| 3,775,941 A | | 12/1973 | Bross |
| 3,820,648 A | * | 6/1974 | Halvorsen ................ 198/463.6 |
| 3,993,217 A | | 11/1976 | Davies et al. |
| 4,119,243 A | | 10/1978 | Marecek et al. |
| 4,377,368 A | | 3/1983 | Koch |
| 4,688,697 A | | 8/1987 | Ballard |
| 5,236,076 A | | 8/1993 | Sung |
| 5,339,984 A | | 8/1994 | Schmidt et al. |
| 5,360,137 A | | 11/1994 | Shinjo et al. |

FOREIGN PATENT DOCUMENTS

JP     11-82420     3/1999

OTHER PUBLICATIONS

Brochure, "Dura–Scape Parts Escapement Devices" R&I Manufacturing Co., Inc., Thomaston, CT, Date Unknown.
Brochure, "BENEFITS: Series 160 Double Rod Escapements", phd, Inc., date unknown.

* cited by examiner

Primary Examiner—James R. Bidwell
(74) Attorney, Agent, or Firm—Bose McKinney & Evans LLP

(57) ABSTRACT

An escapement device configured to control the flow of items along a flow path having a housing, first and second shafts positioned in the housing to move between extended and retracted positions and a spherical lock member positioned to contact one of the shafts to block it from moving between the extended and retracted position.

41 Claims, 5 Drawing Sheets

ESCAPEMENT DEVICE

BACKGROUND AND SUMMARY OF THE INVENTION

The present invention relates to escapement devices. More particularly, the present invention relates to escapement devices configured to control the spacing of components, parts, or other items traveling down a flow path, such as a conveyor.

After the manufacture or unloading of bulk components onto a conveyor, it is often necessary to provide uniform spacing between the components as they travel down the conveyor. For example, this uniform spacing may be required to facilitate attachment of the components to another part, to fill the components with a liquid, to attach a label to the components, or to perform any other process on the components that requires uniform spacing therebetween. Escapement devices are often provided on conveyors or assembly lines to time the release of these components on the conveyor to provide this uniform spacing.

According to one presently preferred embodiment of the present invention, an escapement device is provided that is configured to control the flow of items along a flow path, such as a conveyor. The escapement device includes a housing, first and second shafts positioned in the housing, and a lockout mechanism. The housing includes a channel having a width and a length. The first and second shafts are configured to move between an extended and retracted position. The lockout mechanism is configured to prevent the first and second shafts from simultaneously being positioned in the retracted position and includes a plurality of lock members positioned end to end in the channel.

Each of the lock members is configured to move between first and second positions and have widths less than the length of the channel and greater than one half the width of the channel. A first of the lock members is positioned to contact the first shaft. A second of the lock members is positioned to contact the second shaft. The first lock member blocks movement of the first shaft to the retracted position when in the second position. The second lock member blocks movement of the second shaft to the retracted position when in the first position. Movement of the first shaft to the retracted position causes the first and second lock members to move to the first position. Movement of the second shaft to the retracted position causes the first and second lock members to move to the second position.

According to other preferred embodiments of the present invention, an escapement device is provided that is configured to control the flow of items along a flow path. The escapement device comprises a housing, a first shaft positioned in the housing to move between an extended position and a retracted position, a second shaft positioned in the housing to move between an extended position and a retracted position, and a spherical lock member. The lock member is positioned to contact at least one of the first and second shafts to block said shaft from moving between the extended and retracted positions. The lock member has an outer surface defining an interior region filled with a solid material and defines a circular cross section of the lock member.

According to another preferred embodiment of the present invention, the escapement device includes a plurality of lock members positioned end to end along a channel of the housing. One of the lock members is positioned to contact the first shaft to block movement of the first shaft between the retracted and extended positions. Another of the lock members is positioned to contact the second shaft to block movement of the second shaft between the retracted and extended positions. The lock members have a width that is less than a length of the channel and greater than one half a width of the channel. A first of the lock members is positioned between a second of the lock members and the first shaft. The second lock member is positioned between the first lock member and the second shaft. The first lock member has a first axis of rotation and the second lock has a second axis of rotation spaced apart from the first axis of rotation. At least one of the first and second shafts has a lock surface configured to contact one of the lock members. The lock surface has a depth that is greater than one third the length of said lock member.

Additional features of the disclosure will become apparent to those skilled in the art upon consideration of the following detailed description when taken in conjunction with the accompanying drawings.

BRIEF DESCRIPTION OF THE DRAWINGS

The detailed description particularly refers to the accompanying figures in which.

DETAILED DESCRIPTION OF THE DRAWINGS

Figure 1:
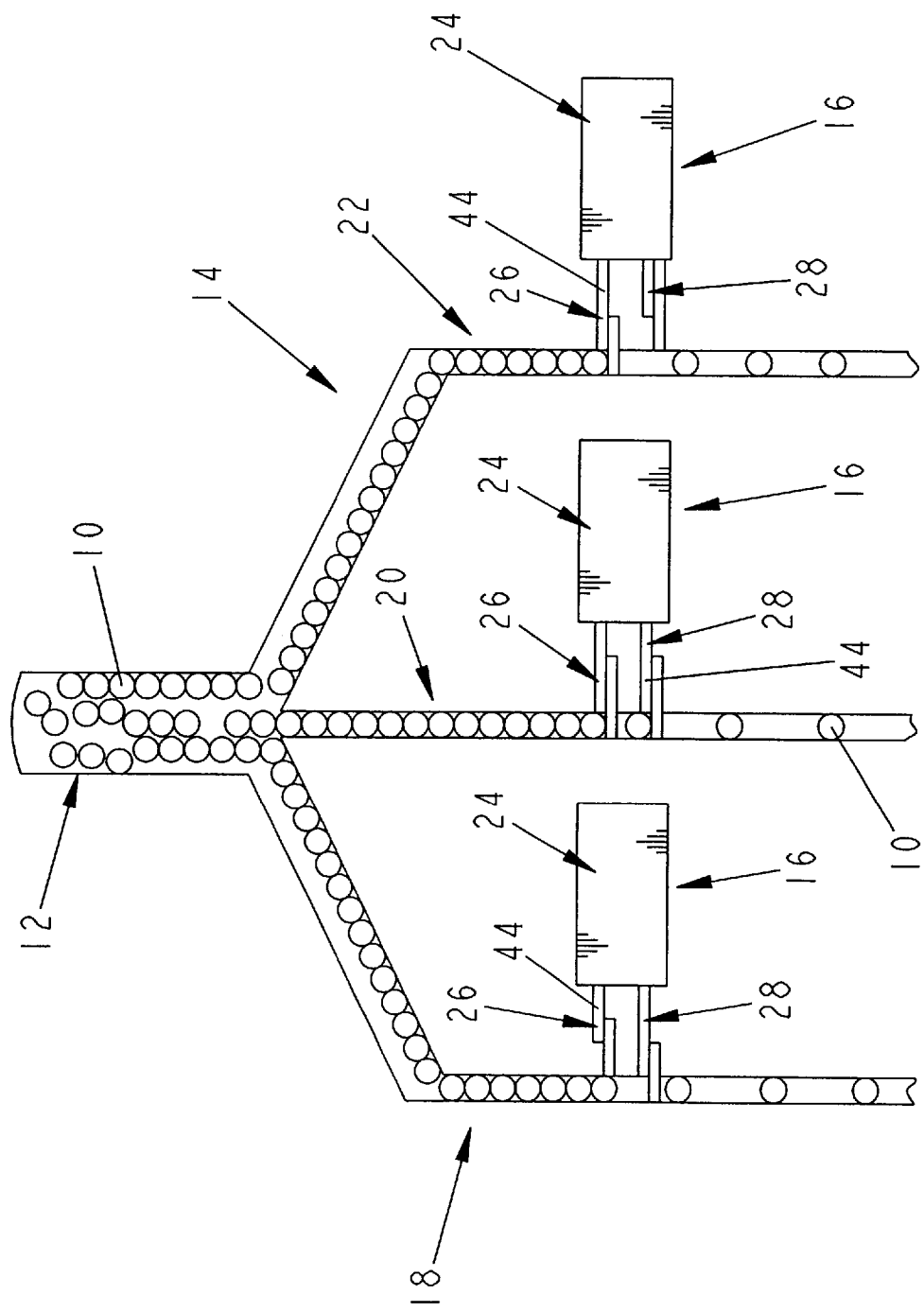
FIG. 1 is a top plan view of a conveyor system having three chutes and three escapement devices positioned adjacent to the respective chutes to time the release of components down the chutes and provide uniform spacing therebetween.

As shown in FIG. 1, bulk components or parts 10 are often loaded into a hopper 12 of a conveyor system 14 in a relatively disorganized fashion. These parts then travel down first, second, and third chutes 18, 20, 22 of conveyor system 14 in a bunched manner. According to the present disclosure, escapement devices 16 are provided adjacent to chutes 18, 20, 22 to introduce uniform spacing between parts 10 to facilitate use of parts 10 in a production process. For example, in an assembly line, it is often important that the spacing of parts 10 be uniform so that the assembler has uniform increments of time between parts 10 to establish a "rhythm" in assembling each respective part 10 to another part. During bottle filling or labeling, it is often important that parts/bottles 10 are uniformly spaced apart so that the timing of filling or labeling of parts/bottles 10 can be coordinated with the position of parts/bottles 10.

As shown in FIG. 1, conveyor system 14 includes three escapement devices 16 configured to coordinate the timing and spacing of parts 10 as they travel down first, second, and third chutes 18, 20, 22 of conveyor system 14. To coordinate the proper spacing, each escapement device 16 moves between an acceptance position (see first chute 18), a hold position (see second chute 20), and a release position (see third chute 22).

Each escapement device 16 includes a housing 24 and first and second shafts 26, 28 extending from housing 24 that move relative to housing 24 to provide the three positions. Movement of the respective first and second shafts 26, 28 is coordinated to provide these positions so that parts 10 travel down the respective chute 18, 20, 22 equally spaced apart or in some other pre-determined spacing as specified by the user.

When in the acceptance position, first shaft 26 is in a retracted position and second shaft 28 is in an extended position so that a part 10 can slide down the respective chute 18, 20, 22 into contact with second shaft 28 as shown, for example, with first chute 18. When in the hold position, first shaft 26 is in an extended position so that a part 10 is trapped between first and second shafts 26, 28 as shown, for example, with second chute 20. When in the release position, second shaft 28 is moved to a retracted position so that part 10 can continue its travel down the respective chute 18, 20, 22 with uniform spacing, as shown for example, with third chute 22. After a part 10 is released, escapement device 16 moves back to the acceptance position by first moving through the hold position.

According to the present disclosure, escapement devices 16 are also configured to prevent parts 10 from traveling in mass down the respective chutes 18, 20, 22 without having the proper spacing therebetween. Thus, each escapement device 16 is configured to prevent both first and second shafts 26, 28 from being in the retracted position simultaneously so that at least one of first and second shafts 26, 28 is in the extended position at all times preventing an unspaced stream of parts 10 from flowing down one of the respective chutes 18, 20, 22. Otherwise, if both shafts 26, 28 were permitted to move to the retracted position simultaneously, parts 10 could travel down respective chutes 18, 20, 22 without having the proper spacing therebetween.

Figure 2:
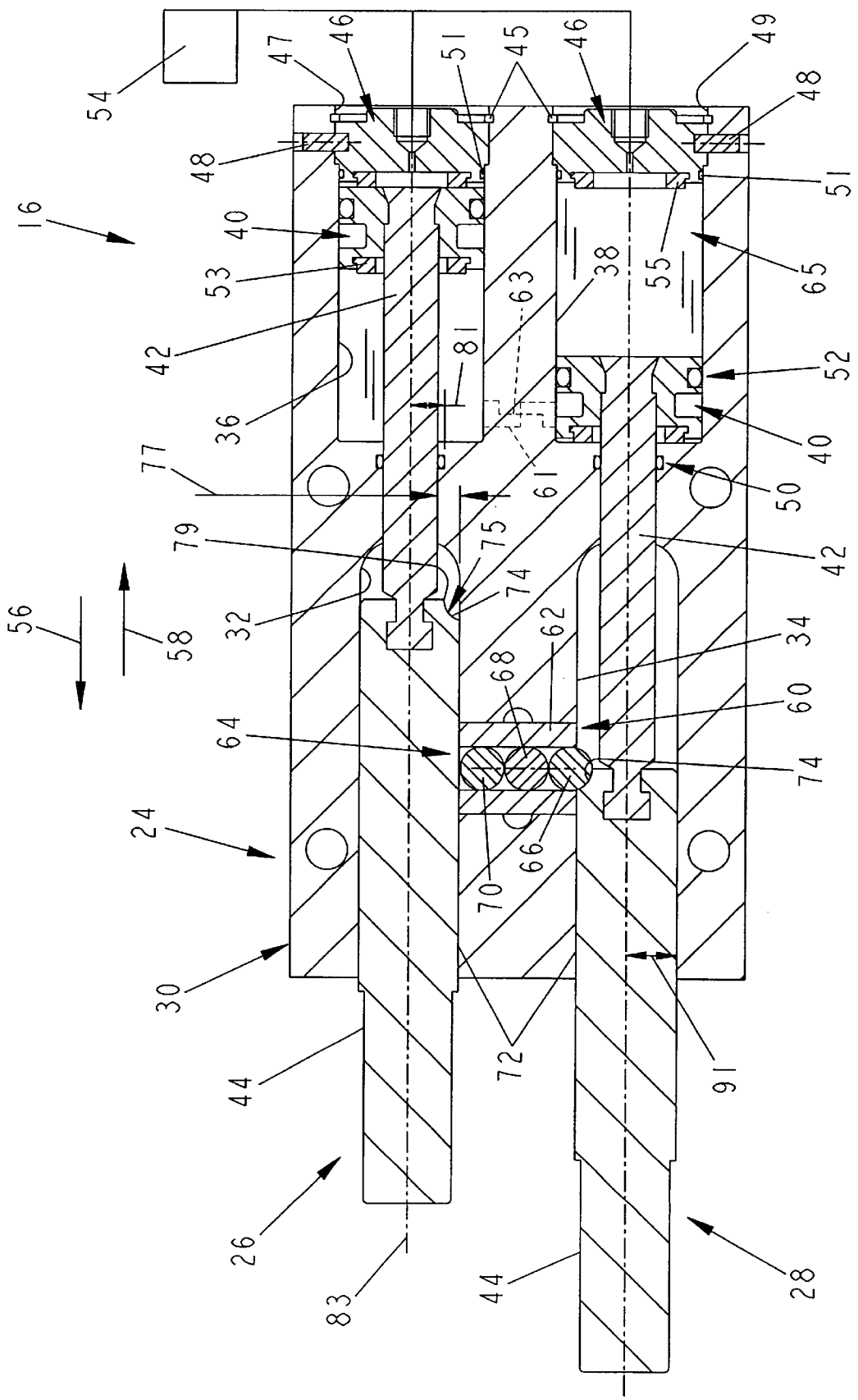
FIG. 2 is a sectional view of a preferred embodiment escapement device showing the escapement device including a housing, first and second shafts extending from the housing, and a lockout mechanism positioned between the shafts in a channel body of the housing, the lockout mechanism including three spherical lock members.

Housing 24 and other components of escapement device 16 are configured to provide the required movement of first and second shafts 26, 28. As shown in FIG. 2, housing 24 includes a main body 30 formed to include first and second shaft passages 32, 34 and first and second piston cylinders 36, 38 sized to receive first and second shafts 26, 28. Each shaft 26, 28 includes a piston 40 positioned within respective first and second piston cylinders 36, 38 and a piston rod 42 coupled to respective pistons 40 and positioned partially in respective first and second shaft passages 32, 34 and first and second piston cylinders 36, 38. Furthermore, first and second shafts 26, 28 include extension rods 44 coupled to respective piston rods 42 and positioned partially within respective first and second shaft passages 32, 34. According to alternative embodiments, additional customized extensions, such as those shown in FIG. 1, are coupled to the extension rods to interact with the parts traveling down the chutes of the conveyor system.

As shown in FIG. 2, housing 24 further includes a pair of plugs 46 positioned in openings 47, 49 in first and second piston cylinders 36, 38. Snap rings 45 are provided to secure plugs 46 in openings 47, 49 and a pair of set screws 48 are provided to prevent plugs 46 from rotating in openings 47, 49. Escapement device 16 further includes a pair of O-rings 51 positioned between plugs 46 and main body 30 to provide a seal therebetween. Similarly, escapement device 16 includes a seal 50 positioned between piston rods 42 and main body 30 to provide a seal therebetween and a pair of piston seals or rings 52 positioned between piston head 40 and piston cylinders 36, 38 to provide a seal therebetween.

A pneumatic system 54 is coupled to each plug 46 to provide a pressurized fluid (not shown), such as air, in a space 65 between respective piston heads 40 and plugs 46. Introduction of the pressurized fluid in space 65 urges respective piston head 40 and respective shaft 26, 28 in a first direction 56 as shown in FIG. 2. A pair of paths 61, 63 are formed in housing 24 between piston cylinders 36, 38 to communicate air between spaces 67 behind piston heads 40. As one piston head 40 extends, the air in space 67 of that piston head 40 is forced through respective passage 61, 63 into space 67 behind the other piston head 40. This air pressurizes respective space 67 to aid in pushing the other piston head 40 to the retracted position forcing air in respective space 65 to exhaust to pneumatic system 54. Piston heads 40 and plugs 46 include bumpers 53,55 configured to "cushion" the impact of piston heads 40 as they reach the respective ends of their travel in directions 56, 58.

Figure 6:
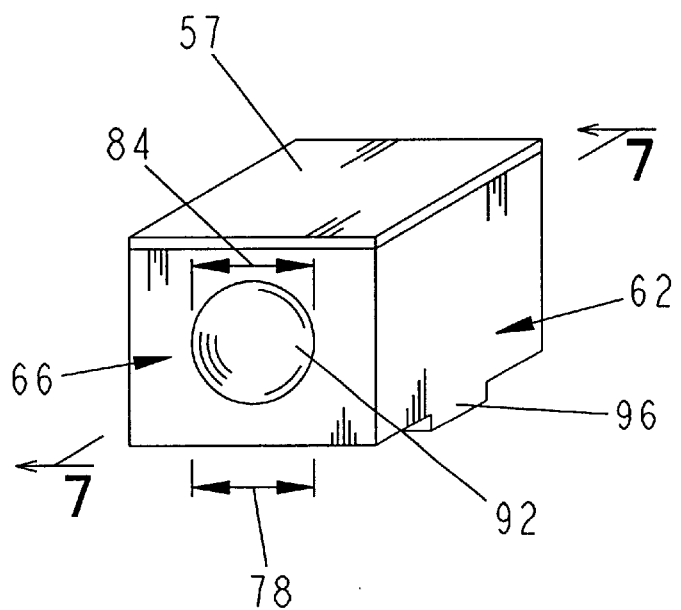
FIG. 6 is a perspective view of the channel body of FIG. 2 showing one of the spherical lock members extending therefrom.
Figure 7:
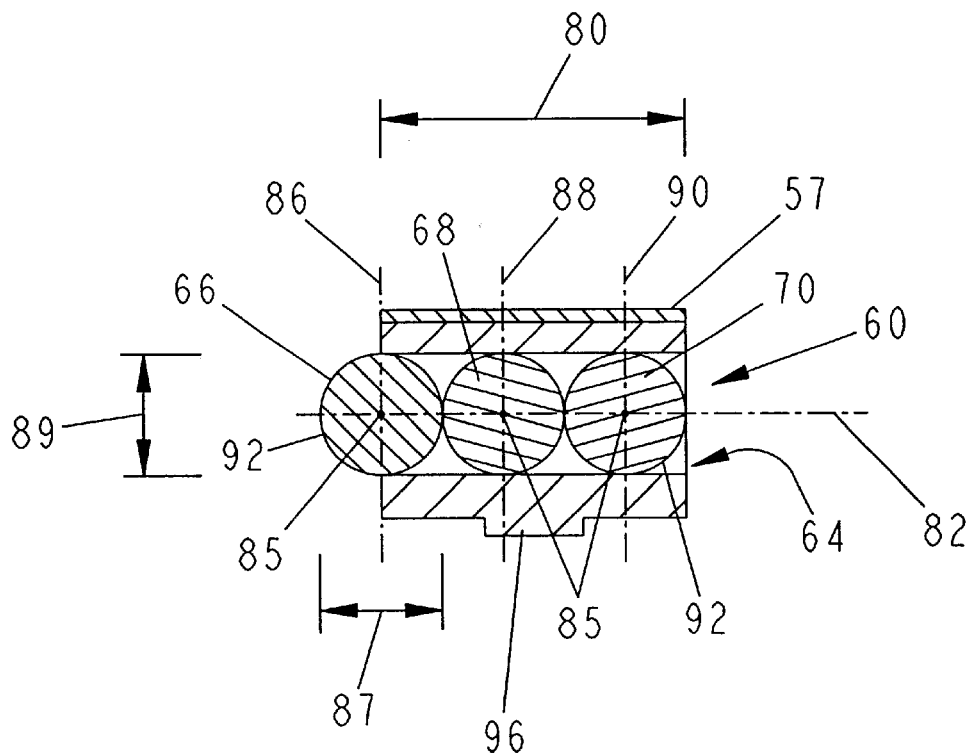
FIG. 7 is a sectional view of the channel body and spherical lock members taken along lines 7—7 of FIG. 6.

As shown in FIGS. 2, 6, and 7, escapement device 16 further includes a lockout mechanism 60 configured to prevent the simultaneous positioning of first and second shafts 26, 28 in the retracted position as previously described. Housing 24 further includes a channel body 62 formed to include a preferably straight channel 64 having a circular cross section sized to receive lockout mechanism 60.

As shown in FIG. 7, channel body 62 includes a location rib 96 sized to fit in a corresponding rib-receiving groove (not shown) of main body 30. Location rib 96 is provided to insure proper positioning of channel body 62 within main body 30. A plate 57 is positioned over channel body 62 and coupled to main body 30 to trap channel body 62 therebetween.

Lockout mechanism 60 includes first, second, and third spherical lock members 66, 68, 70 positioned in channel 64. Lock members 66, 68, 70 are configured to block movement of first and second shafts 26, 28 between the extended and retracted positions to prevent simultaneous positioning of shafts 26, 28 in the retracted positions.

Figure 3:
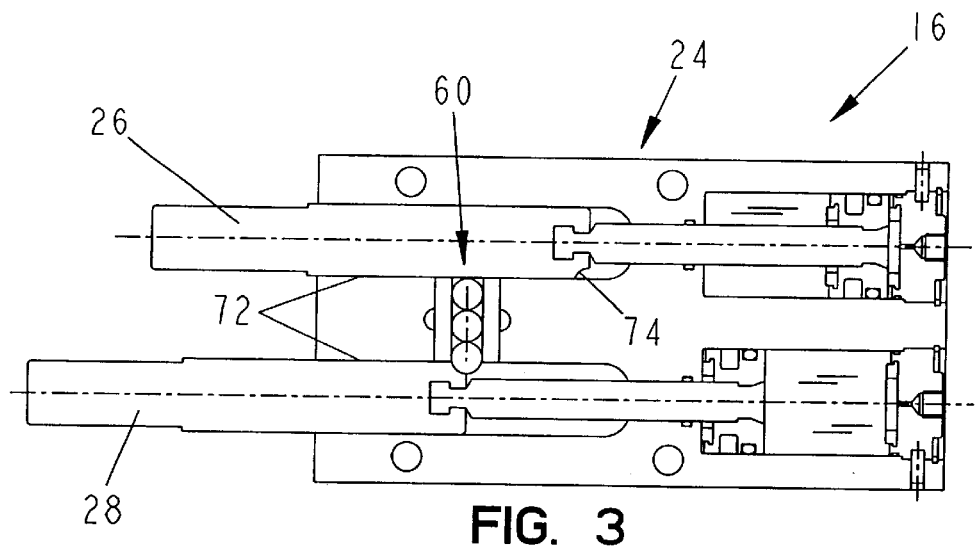
FIG. 3 is a view similar to FIG. 2 showing the first shaft in a retracted position and the second shaft in an extended position.
Figure 4:
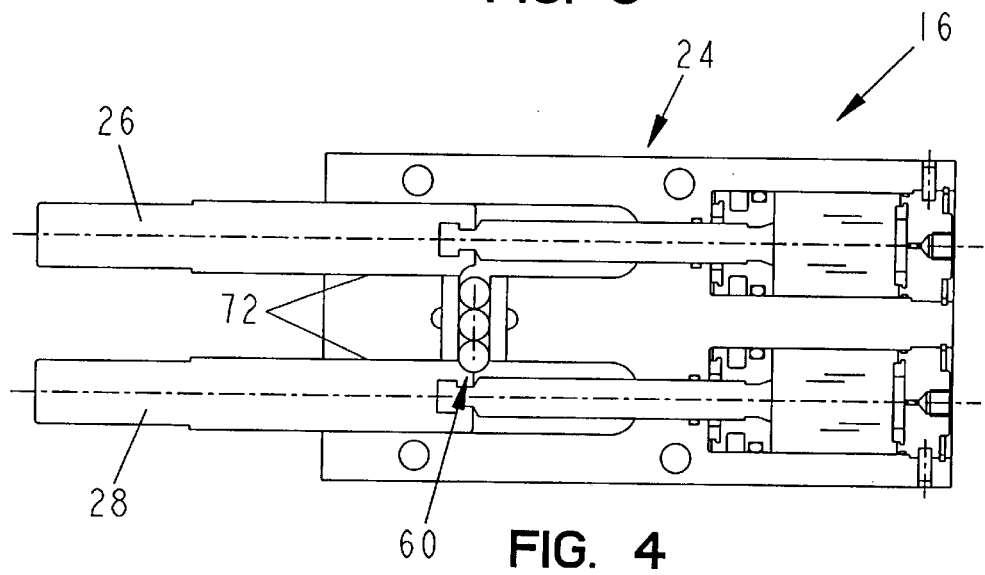
FIG. 4 is a view similar to FIG. 2 showing the first and second shafts in extended positions.
Figure 5:
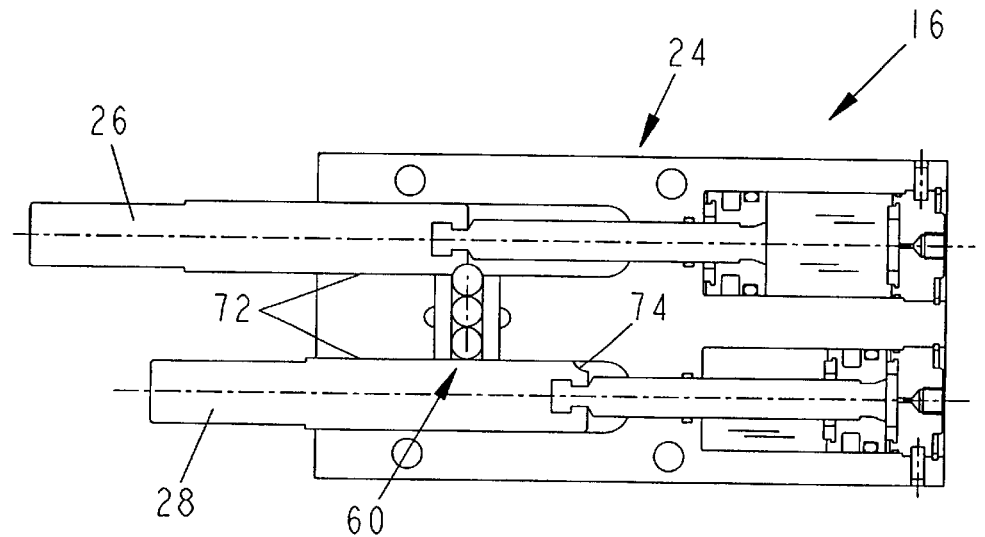
FIG. 5 is a view similar to FIG. 2 showing the first shaft in the extended position and the second shaft in a retracted position.

Depending on the position of the first and second shafts 26, lock members 66, 68, 70 shift between a first position shown in FIGS. 2–4 and a second position shown in FIG. 5. Extension rods 44 of first and second shafts 26, 28 are formed to include a block surface 72 and a lock surface 74 that cooperate with lock members 66, 68, 70 to facilitate blocking movement of shafts 26, 28 to the retracted positions. When first shaft 26 is in the retracted position, block surface 72 prevents lock members 66, 68, 70 from shifting to the second position. As shown in FIG. 3, when lock members 66, 68, 70 are in the first position, third lock member 70 contacts lock surface 74 of second shaft 28. Because of this contact and because lock members 66, 68, 70 cannot shift to the second position, second shaft 28 is blocked from moving to the retracted position even if fluid is added to space 67 of second piston cylinder 38. Thus, if first shaft 26 is in the retracted position, second shaft 28 is blocked from also moving to the retracted position.

As shown in FIG. 4, when first shaft 26 is moved to the extended position, block surface 72 no longer blocks shifting of lock members 66, 68, 70 to the second position. Thus, when both first and second shafts 26, 28 are in the extended positions, first, second, and third lock members 66, 68, 70 may shift between the first and second positions. When second shaft 28 is drawn to the retracted position while first shaft 26 is in the extended position, lock surface 74 of second shaft 28 will push on third lock member 70 to shift first, second, and third lock members 60, 68, 70 to the second position, as shown in FIG. 5.

When second shaft 28 is in the retracted position, block surface 72 of second shaft 28 will prevent first, second, and third lock members 66, 68, 70 from shifting to the first position. As shown in FIG. 5, when lock members 66, 68, 70 are in the second position, first lock member 66 contacts lock surface 74 of first shaft 26. Because of this contact and because first, second, and third-lock members 66, 68, 70 cannot shift to the first position, first shaft 26 is blocked from moving to the retracted position even if fluid is added to space 67 of first piston cylinder 36. Thus, if second shaft 28 is in the retracted position, first shaft 26 is blocked from also moving to the retracted position.

As shown in FIGS. 2, 6, and 7, channel body 62 includes an interior surface 76 defining channel 64. Channel 64 has a width 78, a length 80, and a central axis 82 extending along the length of channel 64. First, second, and third lock members 66, 68, 70 are sized to fit within channel 64 and have a diameter or width 84 that is slightly less than width 78 of channel 64 so that spherical lock members 66, 68, 70 roll within channel 64 during movement between the first and second positions. Because first, second, and third lock members 66, 68, 70 are spheres, they also have lengths 87 and heights 89 equal to width 84.

As shown in FIG. 7, according to preferred embodiments of the present disclosure, when lock members 66, 68, 70 are in either of the first or second positions, two of lock members 66, 68, 70 are positioned completely within channel 64 while the other lock member 66, 70 is positioned halfway out of channel 64 to engage the respective lock surface 74 of first and second shafts 26, 28.

According to alternative embodiments, the lock members are sized so that more or less than one-half of the respective lock member extends from the channel to contact the respective first or second shaft. Thus, the number and size of the lock members is selected so that appropriate proportions, such as one-half, of the respective lock member extend from the channel body and the remainder of the lockout members fit within the channel body. Thus, according to alternative embodiments of the present disclosure, one or more lock members are provided.

Preferably, lock surface 74 has a contour that matches the contour of lock members 66, 70. For example, lock surface 74 has a radius of curvature 75 that is substantially equal to the radius of lock members 66, 68, 70. According to alternative embodiments of the present disclosure, the lock surface is a flat, angled chamfer.

Lock surface 74 has a depth 77 defined as the radial difference between an radially innermost portion 79 of lock surface 74 and block surface 72. As shown in FIG. 2, radially innermost portion 79 is spaced apart from a longitudinal axis 83 of shafts 26, 28 by a first distance 81 and block surface 72 is spaced apart from longitudinal axis 83 by a second distance 91 that is greater than first distance 81. Depth 77 is equal to the difference between these distances 81, 91. Preferably, depth 77 is substantially equal to one half length 87 of lock members 66, 68, 70. According to alternative embodiments of the present disclosure, the depth is a greater or lesser portion of the length of the lock members.

As lock members 66, 68, 70 shift between the first and second positions, they roll in channel 64. Thus, lock members 66, 68, 70 have spaced-apart parallel axes of rotation 86, 88, 90 that pass through respective centers 85 of lock members 66, 68, 70 and central axis 82 of channel 64. Each axis 86, 88, 90 remains substantially parallel to the other axes 86, 88, 90 during rolling of lock members 66, 68, 70 between the first and second positions.

Preferably, lock members 66, 68, 70 are positioned end to end along central axis 82 of channel 64 and are spherical and solid. As shown in FIGS. 2 and 7, each lock member 66, 68, 70 has a substantially circular cross section and an outer surface 92 defining an interior region 94 that is substantially filled with a solid material such as steel.

Figure 8:
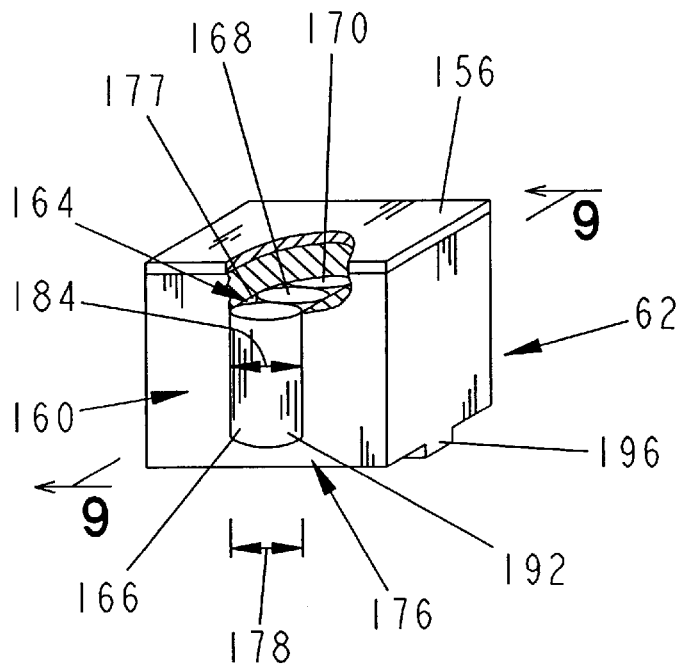
FIG. 8 is a perspective view of an alternative embodiment channel body showing a plurality of alternative embodiment cylindrical lock members positioned therein.
Figure 9:
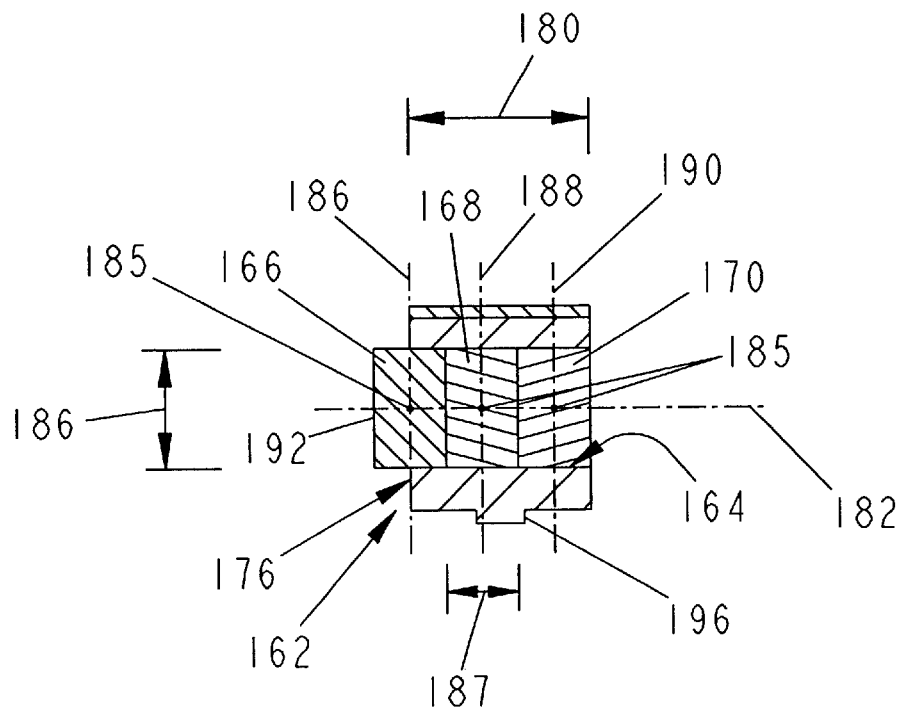
FIG. 9 is a sectional view of the alternative channel body and cylindrical lock members taken along lines 9—9 of FIG. 8.

An alternative embodiment channel body 162 and alternative embodiment lockout mechanism 160 are shown in FIGS. 8 and 9. Channel body 162 is formed to include a preferably straight channel 164 sized to receive lockout mechanism 160.

As shown in FIG. 8, channel body 162 includes a location rib 196 sized to fit in a corresponding rib-receiving groove (not shown) formed in the main body. Location rib 196 is provided to insure proper positioning of channel body 162 within the main body. A plate 156 is positioned over channel body 162 and coupled to the main body to trap channel body 162 therebetween.

Lockout mechanism 160 includes first, second, and third cylindrical lock members 166, 168, 170 positioned in channel 164. Lock members 166, 168, 170 are configured to block movement of first and second shafts 26, 28 between the extended and retracted positions to prevent simultaneous positioning of shafts 26, 28 in the retracted positions.

Depending on the position of the first and second shafts 26, lock members 166, 168, 170 shift between a first position and a second position. When first shaft 26 is in the retracted position, block surface 72 prevents lock members 166, 168, 170 from shifting to the second position. When lock members 166, 168, 170 are in the first position, third lock member 70 contacts lock surface 74 of second shaft 28. Because of this contact and because lock members 166, 168, 170 cannot shift to the second position, second shaft 28 is blocked from moving to the retracted position even if fluid is added to space 67 of second piston cylinder 38. Thus, if first shaft 26 is in the retracted position, second shaft 28 is blocked from also moving to the retracted position.

When first shaft 26 is moved to the extended position, block surface 72 no longer blocks shifting of lock members 166, 168, 170 to the second position. Thus, when both first and second shafts 26, 28 are in the extended positions, first, second, and third lock members 166, 168, 170 may shift between the first and second positions. When second shaft 28 is drawn to the retracted position while first shaft 26 is in the extended position, lock surface 74 of second shaft 28 will push on third lock member 170 to shift first, second, and third lock members 160, 168, 176 to the second position.

When second shaft 28 is in the retracted position, block surface 72 of second shaft 28 will prevent first, second, and third lock members 166, 168, 170 from shifting to the first position. When lock members 166, 168, 170 are in the second position, first lock member 166 contacts lock surface 74 of first shaft 26. Because of this contact and because first, second, and third lock members 166, 168, 170 cannot shift to the first position, first shaft 26 is blocked from moving to the retracted position even if fluid is added to space 67 of first piston cylinder 36. Thus, if second shaft 28 is in the retracted position, first shaft 26 is blocked from also moving to the retracted position.

As shown in FIG. 8, channel body 162 includes an interior surface 177 defining channel 164. Channel 164 has a width 178, a length 180, and a central axis 182 extending along the length of channel 164. First, second, and third lock members 166, 168, 170 are sized to fit within channel 164 and have a height 186 and diameter or width 184 that is slightly less than width 178 of channel 164 so that cylindrical lock members 166, 168, 170 roll within channel 164 during movement between the first and second positions. Because first, second, and third lock members 66, 68, 70 are cylindrical, they also have lengths 187 equal to width.

According to preferred embodiments of the present disclosure, when lock members 166, 168, 170 are in either of the first or second positions, two of lock members 166, 168, 170 are positioned completely within channel 164 while the other lock member 166, 170 is positioned halfway out of channel 164 to engage the respective lock surface 74 of first and second shafts 26, 28. Preferably, radius of curvature of lock surface 74 matches the contour of lock members 166, 170.

According to alternative embodiments, the lock members are sized so that more or less than one-half of the respective lock member extends from the channel to contact the respective first or second shaft. Thus, the number and size of the lock members is selected so that appropriate proportion, such as one-half, of the respective lock member extends from the channel body and the remainder of the lockout members fit within the channel body. Thus, according to alternative embodiments of the present disclosure, one or more lock members are provided.

As lock members 166, 168, 170 shift between the first and second positions, they roll in channel 164. Thus, lock members 166, 168, 170 have spaced-apart parallel axes of rotation 186, 188, 190 that passes through respective centers 185 of lock members 166, 168, 170 and central axis 182 of channel 164. Each axis 186, 188, 190 remains substantially parallel to the other axes 186, 188, 190 during rolling of lock members 166, 168, 170 between the first and second positions.

Preferably, lock members 166, 168, 170 are positioned end to end along central axis 182 of channel 164 and are cylindrical and solid. Each lock member 166, 168, 170 has a substantially circular cross section and an outer surface 192 defining an interior region 194 that is substantially filled with a solid material such as steel.

Although the invention has been described with reference to preferred embodiments, variations and modifications exist within the scope and spirit of the invention as described and defined in the following claims.

What is claimed is:

1. An escapement device configured to control the flow of items along a flow path, the escapement device comprising
 a housing including a channel having a width and a length,
 a first shaft positioned in the housing to move between an extended position and a retracted position,
 a second shaft positioned in the housing to move between an extended position and a retracted position, and
 a lockout mechanism configured to prevent the first and second shafts from simultaneously being positioned in the retracted position, the lockout mechanism including a plurality of lock members positioned end to end in the channel, each of the lock members being configured to move between first and second positions, the lock members having a width less than the length of the channel and greater than one half the width of the channel, a first of the lock members being positioned to contact the first shaft, a second of the lock members being positioned to contact the second shaft, the first lock member blocking movement of the first shaft to the retracted position when in the second position, the second lock member blocking movement of the second shaft to the retracted position when in the first position, movement of the first shaft to the retracted position causing the first and second lock members to move to the first position, movement of the second shaft to the retracted position causing the first and second lock members to move to the second position.

2. The escapement device of claim 1, wherein the first lock member is positioned between the first shaft and the second lock member and the second lock member is positioned between the second shaft and the first lock member.

3. The escapement device of claim 2, the plurality of lock members further including a third lock member positioned between the first and second lock members.

4. The escapement device of claim 1, wherein the plurality of lock members are spherical.

5. The escapement device of claim 1, wherein the plurality of lock members are cylindrical.

6. The escapement device of claim 1, wherein the channel has a central axis and each of the plurality of lock members are positioned on the central axis of the channel.

7. An escapement device configured to control the flow of items along a flow path, the escapement device comprising
 a housing,
 a first shaft positioned in the housing to move between an extended position and a retracted position,
 a second shaft positioned in the housing to move between an extended position and a retracted position, and
 a spherical lock member positioned to contact at least one of the first and second shafts to block said shaft from moving between the extended position and retracted position.

8. The escapement device of claim 7, further comprising another spherical lock member positioned to contact at least one of the first and second shafts to block said shaft from moving between the extended and retracted positions.

9. The escapement device of claim 7, wherein the housing includes a channel having a circular cross section sized to receive the spherical lock member.

10. The escapement device of claim 7, wherein the housing includes a channel having a width and a length, the spherical lock member is positioned in the channel, and the spherical lock member has a width greater than one half the width of the channel.

11. The escapement device of claim 6, wherein at least one of the first and second shafts includes a lock surface positioned to contact the spherical lock member, the lock surface has a radius of curvature, and the lock member has a length substantially equal to twice the radius of curvature of the lock surface.

12. The escapement device of claim 7, further comprising at least two more spherical lock members, wherein the centers of each of the spherical lock members are positioned along a common line.

13. An escapement device configured to control the flow of items along a flow path, the escapement device comprising a housing, a first shaft positioned in the housing to move between an extended position and a retracted position, a second shaft positioned in the housing to move between an extended position and a retracted position, and a lock member positioned to contact at least one of the first and second shafts to block said shaft from moving between the extended and retracted positions, the lock member having an outer surface defining an interior region filed with a solid material, the outer surface of the lock member defining a circular cross section.

14. The escapement device of claim 13, wherein the lock member is spherical.

15. The escapement device of claim 13, wherein the lock member is cylindrical.

16. The escapement device of claim 13, further comprising at least two more lock members, wherein the centers of the lock members are positioned on a common line.

17. The escapement device of claim 16, wherein each of the lock members has a circular cross section.

18. An escapement device configured to control the flow of items along a flow path, the escapement device comprising a housing including a channel, a first shaft positioned to move between an extended position and a retracted position, a second shaft positioned to move between an extended position and a retracted position, and a plurality of lock members positioned end to end along the channel, one of the lock members being positioned to contact the first shaft to block movement of the first shaft between the retracted and extended positions, another of the lock members being positioned to contact the second shaft to block movement of the second shaft between the retracted and extended positions.

19. The escapement device of claim 18, wherein the housing includes a channel, at least one of the lock member is positioned completely within the channel when the first shaft is positioned in the retracted position and one of lock members is positioned at least partially outside of the channel when the first shaft is positioned in the retracted position.

20. The escapement device of claim 18, wherein the lock members shift in a first direction when the first shaft moves to the retracted and in a second direction opposite the first direction when the second shaft moves to the retracted position.

21. The escapement device of claim 20, wherein the first and second directions are linear.

22. An escapement device configured to control the flow of items along a flow path, the escapement device comprising a housing including a channel having a length and a width, a first shaft positioned to move between an extended position and a retracted position, a second shaft positioned to move between an extended position and a retracted position, and a plurality of lock members positioned in the channel of the housing to block movement of the first and second shafts between the extended and retracted positions, the lock members having a width less than the length of the channel and greater than one half the width of the channel.

23. The escapement device of claim 22, wherein the width of the lock members is slightly less than the width of the channel.

24. The escapement device of claim 22, wherein the lock members are cylindrical.

25. The escapement device of claim 22, wherein the lock members are spherical.

26. The escapement device of claim 22, wherein the first shaft is spaced apart from the second shaft by a shaft distance, the width of the lock members is two thirds or less than the shaft distance.

27. An escapement device configured to control the flow of items along a flow path, the escapement device comprising a housing, a first shaft positioned to move between extended and retracted positions, a second shaft positioned to move between extended and retracted positions, and first and second lock members, the first lock member being positioned to contact the first shaft to block movement of the first shaft between the extended and retracted positions, the second lock member being positioned to contact the second shaft to block movement of the second shaft between the extended and retracted positions, the first lock member being positioned between the second lock member and the first shaft, the second lock member being positioned between the first lock member and the second shaft.

28. The escapement device of claim 27, further comprising a third lock member positioned between the first and second lock members.

29. The escapement device of claim 27, wherein the lock members roll in a channel formed in the housing.

30. The escapement device of claim 27, wherein the first and second lock members have a circular cross section.

31. The escapement device of claim 27, wherein the housing includes a channel having a length and a width, the first and second lock members have a width that is less than the length of the channel.

32. The escapement device of claim 27, wherein the first and second lock members have spaced apart axis of rotation.

33. An escapement device configured to control the flow of items along a flow path, the escapement device comprising a housing, a first shaft positioned to move between extended and retracted positions, a second shaft positioned to move between extended and retracted positions, a first lock member positioned to block movement of the first shaft between the extended and retracted positions, the first lock member having a first axis of rotation, and a second lock member positioned to block movement of the second shaft between the extended and retracted positions, the second lock having a second axis of rotation spaced apart from the first axis of rotation.

34. The escapement device of claim 33, wherein the first and second lock members are spherical.

35. The escapement device of claim 33, wherein the first and second lock member are cylindrical.

36. The escapement device of claim 33, wherein the first axis of rotation is parallel with the second axis of rotation.

37. The escapement device of claim 33, wherein the housing includes a channel having a central axis, the first and second lock members are positioned in the channel, and the first and second axes of rotation extend through the central axis of the channel.

38. An escapement device configured to control the flow of items along a flow path, the escapement device comprising a housing, a first shaft positioned to move between first and second positions, the first shaft including a longitudinal axis, an outer surface, and a lock surface, the outer surface being radially spaced apart from the longitudinal axis by a first distance, a radially innermost portion of the lock surface being radially spaced apart from the longitudinal axis by a second distance less than the first distance, the lock surface having a depth equal to the difference between the first and second distances, a second shaft positioned to move between first and second positions, and a lock member positioned to contact the lock surface of the first shaft to block movement of the first shaft to the retracted position when the second shaft is in the retracted position, the lock member having a width and a length, the depth of the lock surface being greater than one third the length of the lock member.

39. The escapement device of claim 38, wherein the depth of the lock surface is substantially equal to one half the length of the lock member.

40. The escapement device of claim 38, wherein the length of the lock member is substantially equal to the width of the lock member.

41. The escapement device of claim 38, further comprising an additional lock member, wherein the second shaft includes a longitudinal axis, an outer surface, and a lock surface, the outer surface being radially spaced apart from the longitudinal axis by a first distance, a radially innermost portion of the lock surface being radially spaced apart from the longitudinal axis by a second distance less than the first distance, the lock surface having a depth equal to the difference between the first and second distances, the additional lock member is positioned to contact the lock surface of the second shaft to block movement of the second shaft to the retracted position when the first shaft is in the retracted position, the additional lock member has a width and a length, the depth of the lock surface of the second shaft is greater than one third the length of the additional lock member.

* * * * *